US012650192B2

(12) United States Patent
Sterns

(10) Patent No.: US 12,650,192 B2
(45) Date of Patent: Jun. 9, 2026

(54) CONNECTION DEVICE FOR VALVES AND VALVE ARRANGEMENT EQUIPPED THEREWITH

(71) Applicant: Festo SE & Co. KG, Esslingen (DE)

(72) Inventor: Frank Sterns, Schönaich (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 18/830,132

(22) Filed: Sep. 10, 2024

(65) Prior Publication Data

US 2025/0084941 A1      Mar. 13, 2025

(30) Foreign Application Priority Data

Sep. 13, 2023    (DE) ..................... 10 2023 124 744.1

(51) Int. Cl.
  *F16L 37/14*          (2006.01)
  *F16K 27/00*          (2006.01)
       (Continued)
(52) U.S. Cl.
  CPC ............ *F16L 37/144* (2013.01); *F16K 27/00* (2013.01); *F16L 37/1225* (2013.01); *F16L 39/00* (2013.01); *F16L 41/001* (2013.01); *F16L 37/092* (2013.01)
(58) Field of Classification Search
  CPC ..... F16L 39/00; F16L 37/144; F16L 37/1225; F16L 41/001
  See application file for complete search history.

(56) References Cited

U.S. PATENT DOCUMENTS 5,333,647 A * 8/1994 Fukano ................... F16L 39/00
                                                    137/271
5,459,953 A * 10/1995 Fukano ................... F16L 39/00
                                                    137/884
(Continued)

FOREIGN PATENT DOCUMENTS

DE        20011475 U1 * 9/2000 ............ F16L 37/144
DE      696 17 158 T2    6/2002
(Continued)

OTHER PUBLICATIONS

Examination Report issued in corresponding German Patent Application No. 10 2023 124 744.1, Mar. 8, 2024, 4 pages.

*Primary Examiner* — Matthew Troutman
*Assistant Examiner* — Fannie Kee
(74) *Attorney, Agent, or Firm* — HSML P.C.

(57) ABSTRACT

A connection device for valves, with a connection body extending along a main axis, which main body has several consecutive valve mounting stands in direction of the main axis, on which valve body valves can be or are mounted. The valve body is provided with at least one row of several consecutive receiving recesses likewise in direction of the main axis, which receiving recesses are transverse to the main axis and leading to a common connection surface of the connection body, which receiving recesses communicate with the connection body channels passing into the connection body and into which suitable connection units can be or are inserted for connecting fluid lines. The inserted use position can be detachably fixed to the connection body by locking means having at least one U-shaped locking bracket. The locking means contain at least two locking channels extending along the main axis in the connection body.

14 Claims, 4 Drawing Sheets

(51) Int. Cl.

| | | |
|---|---|---|
| *F16L 37/12* | (2006.01) | |
| *F16L 39/00* | (2006.01) | |
| *F16L 41/00* | (2006.01) | |
| F16L 37/092 | (2006.01) | |

(56) References Cited

U.S. PATENT DOCUMENTS

| | | | | |
|---|---|---|---|---|
| 5,699,834 | A | 12/1997 | Hayashi | |
| 5,944,056 | A * | 8/1999 | Miyazoe | F16L 39/00 |
| | | | | 137/884 |
| 6,237,634 | B1 * | 5/2001 | Narita | F16L 39/00 |
| | | | | 137/884 |
| 6,425,416 | B1 * | 7/2002 | Narita | F16L 39/00 |
| | | | | 137/884 |
| 6,832,788 | B2 | 12/2004 | Fukano et al. | |
| 7,252,116 | B2 * | 8/2007 | Miyazoe | F16L 39/00 |
| | | | | 137/271 |
| 2003/0193187 | A1 * | 10/2003 | Takada | F16L 39/00 |
| | | | | 285/120.1 |

FOREIGN PATENT DOCUMENTS

| | | | |
|---|---|---|---|
| DE | 10 2006 057 850 | 6/2008 | |
| JP | 08075071 A * | 3/1996 | F16L 39/00 |
| WO | WO-2007034607 A1 * | 3/2007 | F16L 37/144 |

* cited by examiner

CONNECTION DEVICE FOR VALVES AND VALVE ARRANGEMENT EQUIPPED THEREWITH

This application claims the benefit of German application DE 10 2023 124 744.1 filed Sep. 13, 2023, which is incorporated herein by reference.

The invention relates to a connection device for valves, with a connection body extending along a main axis, which main body has several consecutive valve mounting stands in direction of the main axis, on which valve body valves can be or are mounted, and which valve body is provided with at least one row of several consecutive receiving recesses likewise in direction of the main axis, which receiving recesses are transverse to the main axis and leading to a common connection surface of the connection body, which receiving recesses communicate with the connection body channels passing into the connection body and into which suitable connection units can be or are inserted for connecting fluid lines, the inserted use position of which can be detachably fixed to the connection body by locking means having at least one U-shaped locking bracket.

Such connection devices for valves have been known for a long time, for example from U.S. Pat. No. 6,832,788 B2. A valve array described there contains a connection device provided to be equipped with valves, which connection device has a connection body segmented multiple times in direction of its longitudinal axis and penetrated by connection body channels. A row of receiving recesses is located on a lateral connection surface of the connection body, in which recesses suitable connection units are introduced for connecting fluid lines. These connection units are fixed to the connection body by locking means which contain a U-shaped locking bracket for each connection unit, which bracket can be inserted transverse to the main axis, thus in the normal installation position from top to bottom in the connection body, with the result that it engages in the associated connection unit and secures this against withdrawal. The connection units can actually be fixed very reliably to the connection body. However, manipulation is quite awkward due to the large number of components.

SUMMARY OF INVENTION

Therefore, the object of the invention is to create a connection device in which a larger number of connection units of fluid lines can also be installed in a time-saving manner.

This object is achieved by a connection device for valves of the type named at the outset, with the features of independent claim 1. Developments of the invention are shown in the dependent claims.

The connection device according to the invention is wherein the locking means contain at least two locking channels at a transverse distance from one another and aligned parallel to one another, which locking channels extend along the main axis in the connection body and in so doing each transversely penetrate at least several receiving recesses of the at least one row of receiving recesses, in which locking channels the U-shaped locking bracket can be or is inserted, longitudinally displaceable, wherein the locking bracket can assume a lock position in which it reaches through several of the consecutive receiving recesses simultaneously and is in locking engagement with the connection unit inserted therein by preventing withdrawal thereof.

In the aforementioned prior art, each of the connection units associated with a row of receiving recesses is individually fixed. Merely when there are several rows of receiving recesses present, two receiving recesses arranged vertically on top of each other can be fixed simultaneously by the U-shaped locking bracket. In any case, a plurality of locking brackets is needed here. The invention creates the possibility of jointly fixing several, preferably all, connection units associated with one and the same row of receiving recesses. All previously introduced connection units can be fixed in one pass, and thus in very-time saving manner, by inserting the locking bracket in the locking channel in the same direction as that of the main axis of the connection body. A considerable saving on components also results from assigning at least one locking bracket to several receiving recesses of one and the same row of receiving recesses simultaneously.

In a further development of the invention, each of the locking channels penetrates all receiving recesses of the at least one row of receiving recesses. In particularly preferred manner, the at least one locking bracket introduced into the associated two locking channels reaches through all receiving recesses of this row of receiving recesses in its lock position, and can thereby jointly fix all connection units associated with this row of receiving recesses in the use position thereof. Such a multiple locking is useful in particular with higher loads, as the U-shaped locking bracket can engage at different peripheral sections of the connection units separated from one another in peripheral direction.

It is advantageous when each of the receiving recesses is broached by the associated locking channel in the region of its outer periphery, like a secant. The locking engagement on the immediate region of the outer periphery of the connection units can be limited by this, whereas the remaining cross-section thereof can be used without any restriction, to guide through a fluid.

In a development of the invention, several rows of receiving recesses are aligned transverse to the main axis vertically on top of each other at the connection body, wherein two of the locking channels, above and below the receiving recesses, are associated with each row of receiving recesses.

In particularly preferred manner, the locking channels are designed as a groove and open on their long side. Preferably, the locking channels are open on the long side towards the connection surface to which the receiving recesses also lead. If required, such locking channels can be implemented both by cutting and also particularly advantageously without cutting, directly when extruding a one-piece connection body designed as an extruded part.

In particularly preferred manner, the U-shaped locking bracket has two bracket flanks aligned substantially parallel to one another, which flanks are connected to one another by a bracket bar.

Expediently, the bracket flanks each have a round, in particular circular, cross-section.

Expediently, the U-shaped locking bracket is made of wire material, wherein it can be reshaped from a bent wire rod by repeated bending to form the U-shaped locking bracket.

It is for example also possible to provide a multi-locking bracket which simultaneously possesses more than two, for example four, bracket flanks, whereby simultaneously two superposed rows of receiving recesses can be secured via this multi-locking bracket. Such a multi-locking bracket can also be produced from an originally elongate wire rod by repeated bending.

In a development of the invention, the securing means has at least one elbow designed on one of the bracket flanks of the locking bracket, which elbow has a bearing surface which, in the lock position, abuts against a counter bearing surface designed on one of the connection bodies and prevents the locking bracket from being unintentionally withdrawn.

In particularly preferred manner, both bracket flanks of each locking bracket have elbows opposite one another and springing toward one another.

In a locking bracket made of wire material, the elbows can be produced simply by a suitable compression process on the two bracket flanks.

In a development of the invention, the connection body is a one-piece component.

The invention further comprises a valve array, with a connection device according to one of claims 1 to 14, on the valve mounting stands of which electrically actuatable valves are mounted, which valves are preferably multiway valves, for example 3/2, 5/2, or 5/3 multiway valves.

BRIEF DESCRIPTION OF THE DRAWINGS

A preferred embodiment example of the invention is represented in the drawing and explained below in more detail. There are shown in the drawings:

FIGS. 1 to 4 show a preferred embodiment example of the valve array 11 according to the invention, equipped with the connection device 12 according to the invention. The connection device 12 comprises several valves 13.

DETAILED DESCRIPTION OF INVENTION

Figure 3:
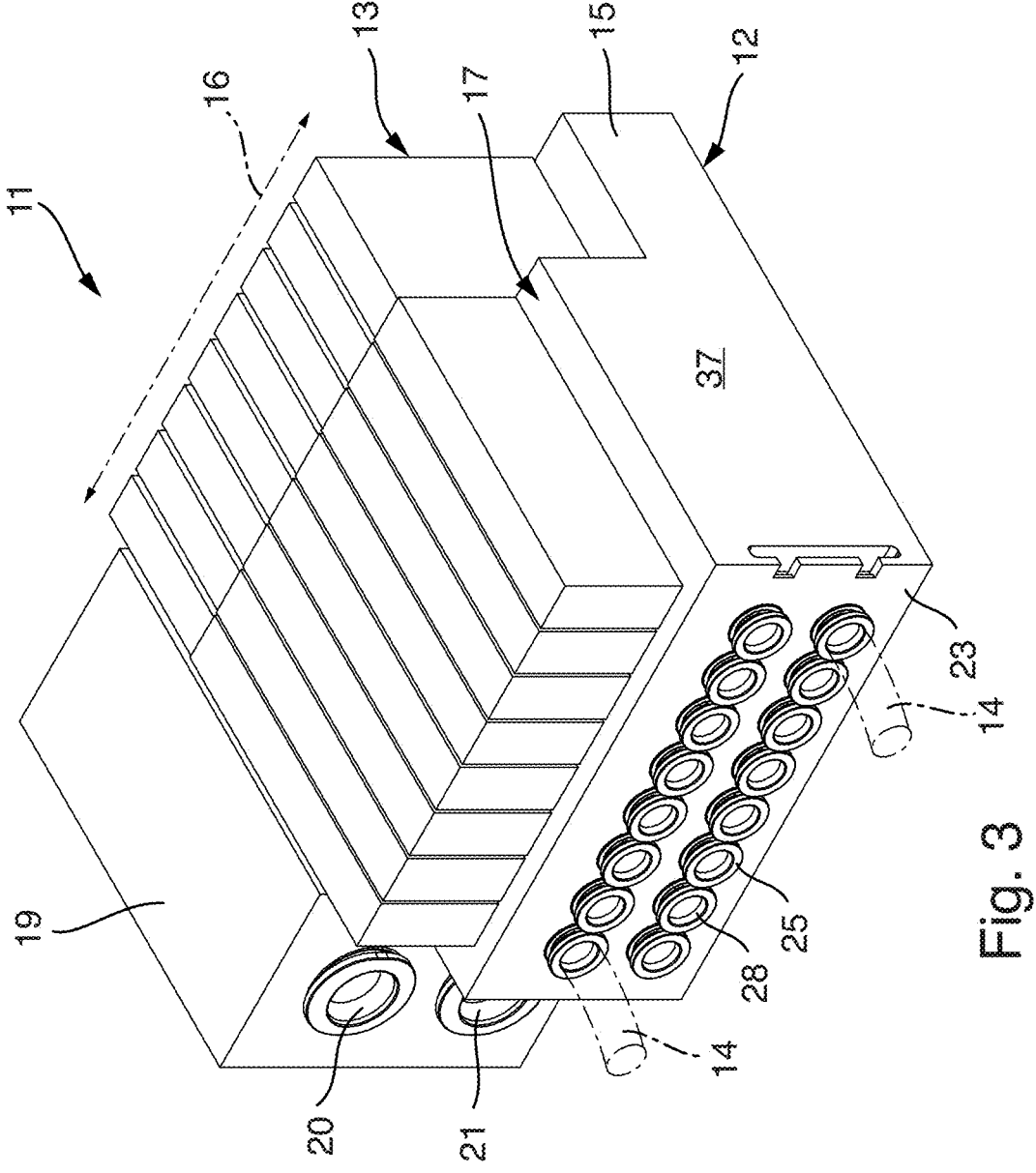
FIG. 3: a perspective view of the valve array of FIG. 1 with inserted and locked connection units

The connection device 12 makes it possible to connect fluid lines 14 fluidically to the valves 13, which lines are merely indicated in FIG. 3 and lead to appliances which are not shown further. In this way the fluid flow into the fluid lines 14 can be influenced by the valves 13.

The connection device 12 contains a connection body 15 which extends along a main axis 16, which axis is in particular the longitudinal axis of the connection body.

The connection body 15 possesses a mounting surface 17 which is divided into several consecutive valve mounting stands 18 (FIG. 4) in direction of the main axis 16, on each of which stands, in particular detachably, one of the already mentioned valves 13 is mounted. The valves 13 are multi-way valves, for example in the form of a 3/2 multiway valve or, as shown here in FIG. 1 to 4, a 5/2 or 5/3 multiway valve. The multiway valves can be actuated electrically and each have an electrically activatable valve drive, for example in the form of one or more solenoid valves.

Figure 4:
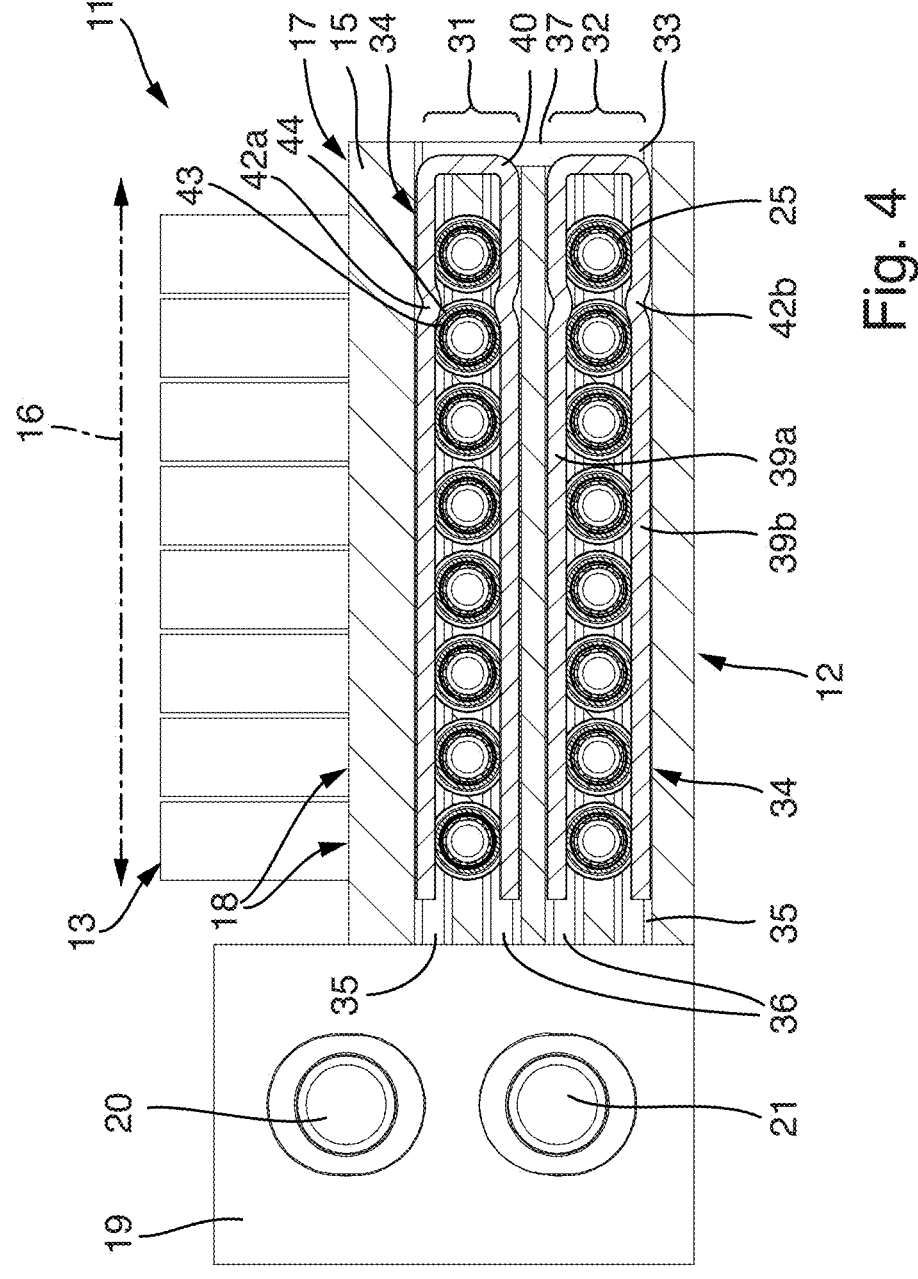
FIG. 4: a longitudinal section through the valve array along the line IV-IV from FIG. 1.

As shown in particular in FIG. 4, a fluid supply body 19 is docked to the connection body 15 in main axis direction aligned in series to the valves 13, in particular at the end face of the connection body 15. The fluid supply body 19 possesses a delivery connection 20, via which the hydraulic fluid is supplied and can reach the connection body 15, and from there the valves 13. Furthermore, yet another ventilation connection 21 is provided at the fluid supply body 19, via which connection ventilation can take place centrally.

The connection body 15 is penetrated in particular in direction of its main axis 16 by several first connection body channels (not shown), which lead to the individual valve mounting stands 18 via branch channels (not shown). There they communicate with valve channels of the valves 13, not shown in more detail.

Typically, the first connection body channels are a delivery channel and at least one more of the first connection body channels is a drainage channel. The valves 13 can be supplied with a pressurised fluid to be distributed by the valves 13 via the delivery channel which is connected to the delivery connection at the fluid supply body 19, while the spent pressurised fluid flows back via the drainage channel. Preferably, compressed air is used as pressurised fluid.

For example, two second connection body channels 22 (FIG. 1) proceed from each valve mounting stand 18, which channels penetrate the connection body 15 transverse to the main axis 16 and lead to a long side connection surface 23 of the connection body 15.

The two connection body channels 22 each terminate at one of the receiving recess 24 (FIG. 1) leading to the connection surface 23, which recess is suitable for receiving, in whole or in part, a connection unit 25 making possible connection of a fluid line 14. The receiving recess 24 possesses a longitudinal axis 26 (FIG. 1), which runs at right angles to the main axis 16 and is oriented in particular also at right angles to the connection surface 23.

Mounting surface 17 and connection surface 23 in particular possess an alignment displaced by 90° from one another, wherein they connect in particular directly to one another.

The connection units 25 have a socket 27 which can be inserted suitably into the associated receiving recess 24, which socket comprises a fastening device 28 pointing outwards in direction of the longitudinal axis 26 and in particular projecting over the connection surface 23. The fastening device 28 is in particular designed to make possible a detachable, sealed push-fit fitting of a fluid line 14, in particular a fluid tube. For this, the fastening device 28 can possess tongs and/or fastening claws which apply the inserted fluid line 14 at the outer periphery in order to hold it fast.

Each connection unit 25 is mounted to or dismounted from the connection body 15 by insertion, which takes place in direction of the longitudinal axis 26 and withdrawal into or out of the receiving recess 24 according to arrows 29, 30.

A connection unit 25 which can be mounted or dismounted by such insertion and withdrawal could also be called a push-in fitting.

The second connection body channels can be called working channels because an individual connection of each associated valve 13 into an appliance to be controlled is possible via same.

Unlike the embodiment example in which every valve mounting stand 18 and every valve 13 arranged thereon communicates with second connection body channels 22, a design with only one second connection body channel 22 would for example be conceivable. The number is dependent essentially on the type of valves 13 being used, wherein in the most recently named case a 3/2 multiway valve would be conceivable as an alternative to the 5/2 multiway valves shown.

The receiving recesses 24 are merged in two rows of receiving recesses, hereinafter known as first and second row of receiving recesses 31, 32. The latter extend at a distance parallel to one another, and in direction of the main axis 16. If all receiving recesses 24 are equipped with connection units 25, accordingly two rows of connection units 25 which lie adjacent to one another are produced.

The connection device 12 also comprises locking means 33 which make it possible to lock the connection units 25 of each row of receiving recesses 31, 32, detachably, in inserted use state such that they can no longer be withdrawn. In locked state, the connection units 25 are fixed, axially substantially immobile, in the receiving recess 24.

Figure 1:
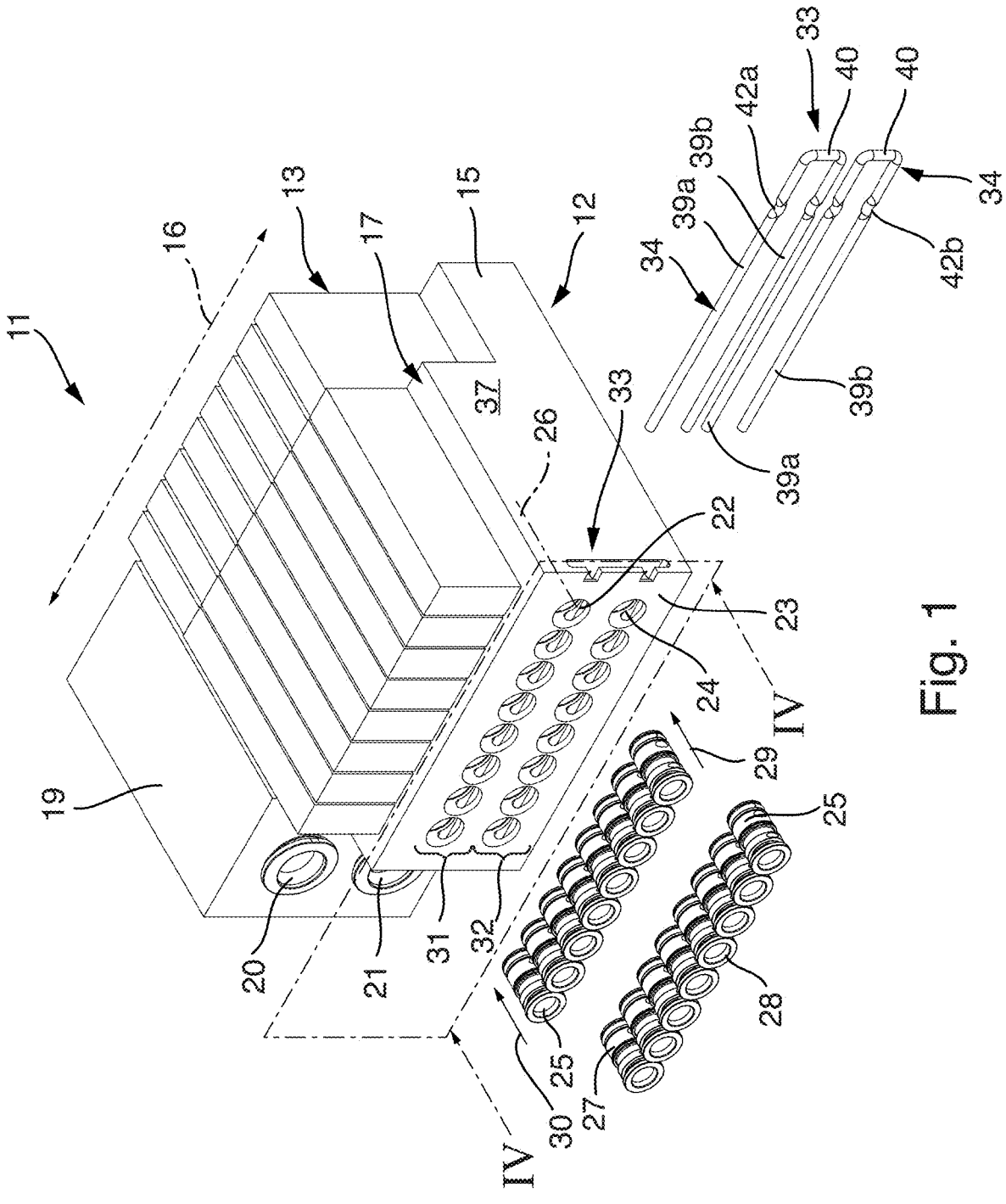
FIG. 1: a perspective exploded view of a preferred embodiment example of the connection device according to the invention as a component of a valve array.
Figure 2:
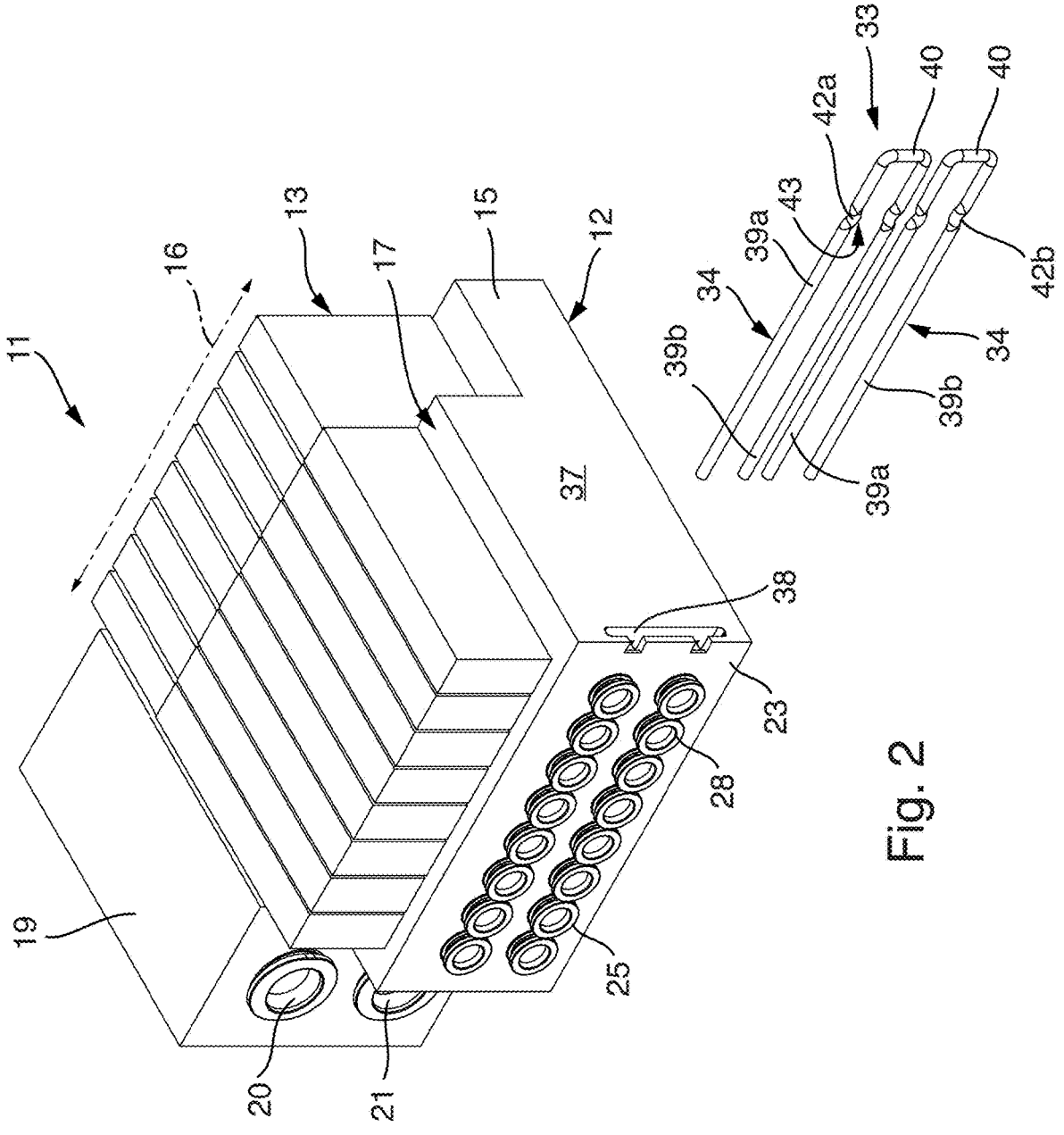
FIG. 2: a perspective view of the valve array of FIG. 1 with inserted, but not locked, connection units.

As shown in particular in FIGS. 1, 2 and 4, the locking means 33 possess at least one U-shaped locking bracket 34, in the shown example case two locking brackets 34 each associated with a row of receiving recesses.

The locking means 33 for the two rows of receiving recesses 31, 32 are designed to be identical in the embodiment example. Therefore, the further description can be limited to the locking means 33 of the first row of receiving recesses 31 respectively lying at the top of the drawing. The statements apply accordingly to the second row of receiving recesses 32.

In addition to the already mentioned locking brackets 34, the locking means 33 associated with the first row of receiving recesses 31 contain at least two locking channels 35, 36 (FIG. 4) running parallel to one another at a mutual distance and in the same direction of the main axis 16, which channels are arranged such that they penetrate all receiving recesses 24. They are in particular placed such that they come to rest at diametrically opposite peripheral regions of the receiving recesses 24 and thus broach these at a point of its periphery in the manner of a secant.

Both locking channels 35, 36 are open at the end face, in particular at both end faces. They therefore lead to the two end faces 37 of the connection body 15 oriented in direction of the main axis 16. It is possible to push the U-shaped locking bracket 34 associated with the two locking channels 35, 36 via one of the two end-face openings 38 into the locking channels 35, 36 lengthwise. In this way, the U-shaped locking bracket 34 can be positioned in a lock position (FIG. 4) in which it simultaneously reaches through all receiving recesses 24 in order to come into locking contact with the connection units 25 inserted therein. In the shown example case, the end-face openings of the locking channels for the upper and lower row of receiving recesses are merged, with the result that a multi-locking bracket also described in more detail below can be pushed in.

As shown further in FIGS. 1, 2 and 4 the U-shaped locking bracket possesses two bracket flanks 39a, 39b aligned substantially parallel to one another, which flanks are connected to one another by a bracket bar 40 or transverse bar.

In the shown example case the locking bracket 34 is made of wire material, for example round wire. In simple manner, the locking bracket can be reshaped from a straight wire rod by repeated bending to shape the U-shaped locking bracket 34.

Such production can be carried out relatively easily and quickly. Expediently, when producing the connection body, which in the shown example case is designed to be one piece, the locking channels 35, 36 are designed at the same time.

Expediently, the connection device 12 is equipped with securing means which make possible positional security of the locking bracket 34 in its lock position. The securing means shown by way of example secure the axial position of the locking bracket 34 by positive locking.

For this, the securing means display at least one elbow 42a, 42b designed on one of the bracket flanks 39a, 39b of the locking bracket 34.

In the shown example case, both bracket flanks 39a, 39b of each locking bracket 34 have elbows 42a, 42b opposite one another and springing toward one another.

Each of the elbows 42a, 42b has a bearing surface 43 which, in the lock position, abuts against a counter bearing surface 44 designed on one of the connection units 25 and prevents the locking bracket 34 from being unintentionally withdrawn.

In an embodiment example which is not shown, a multi-locking bracket is provided with which the first row of receiving recesses 31 and second row of receiving recesses 32, lying beneath same, can be locked simultaneously with the equipped connection units 45. For the shown embodiment example, this multi-locking bracket possesses four bracket flanks, optionally with a transverse bar 40 connecting all four bracket flanks to one another, which transverse bar can be introduced via the opening 38.

The invention claimed is:

1. A connection device for valves, comprising:
   a connection body extending along a main axis,
   the connection body having consecutive valve mounting stands in a direction of the main axis, on which valves are configured to be mounted, and the connection body being provided with at least one row of consecutive receiving recesses in the direction of the main axis, wherein the receiving recesses are transverse to the main axis and leading to a common connection surface of the connection body,
   the receiving recesses communicating with connection body channels passing into the connection body and into which connection units are configured to be inserted for connecting fluid lines, an inserted use position of which can be detachably fixed to the connection body by locking means having at least one U-shaped locking bracket,
   wherein the locking means contain at least two locking channels at a distance from one another and aligned parallel to one another, wherein the at least two locking channels extend along the main axis in the connection body and in so doing each transversely penetrates at least two consecutive receiving recesses of the at least one row of receiving recesses, wherein the at least one U-shaped locking bracket is configured to be inserted and is longitudinally displaceable into the at least two locking channels, wherein the at least one locking bracket is configured to assume a lock position in which the at least one locking bracket reaches through the at least two consecutive receiving recesses simultaneously and is in locking engagement with the connection unit inserted therein by preventing withdrawal thereof,
   wherein the at least one row of receiving recesses includes a first and a second row of receiving recesses that are aligned vertically on top of each other at the connection body, and wherein two of the at least two locking channels, that are above and below the receiving recesses, are associated with each row of the first and second rows of receiving recesses.

2. The connection device according to claim 1, wherein the at least two locking channels each penetrate all receiving recesses of the at least one row of receiving recesses.

3. The connection device according to claim 1, wherein the at least one locking bracket introduced into the at least two locking channels reaches through all receiving recesses of the at least one row of receiving recesses in a lock position, and can thereby jointly fix all connection units associated with the at least one row of receiving recesses in the use position thereof.

4. The connection device according to claim 1, wherein each of the at least two locking channels broaches the receiving recesses penetrated by same at a point of a periphery of the receiving recesses.

5. The connection device according to claim 1, wherein the at least two locking channels associated with the at least one row of receiving recesses penetrate the receiving recesses at peripheral regions diametrically opposite one another.

6. The connection device according to claim 1, wherein the at least two locking channels are designed as a groove and are open at least along one end face of the groove.

7. The connection device according to claim 1, wherein the at least one U-shaped locking bracket has two bracket flanks aligned substantially parallel to one another, which flanks are connected to one another by a bracket bar.

8. The connection device according to claim 7, wherein the two bracket flanks each have a round cross-section.

9. The connection device according to claim 7, wherein securing means are present through which the at least one locking bracket is or can be fastened, releasably and non-displaceably, in the lock position.

10. The connection device according to claim 9, wherein the securing means has at least one elbow designed on one of the bracket flanks of the at least one locking bracket, which the at least one elbow has a bearing surface which, in the lock position, abuts against a counter bearing surface designed on one of the connection units and prevents the at least one locking bracket from being unintentionally withdrawn.

11. The connection device according to claim 10, wherein both bracket flanks of the at least one locking bracket have elbows opposite one another and springing toward one another.

12. The connection device according to claim 1, wherein the connection body is a one-piece component.

13. The connection device according to claim 12, wherein the connection body is a one-piece extruded part in which the at least two locking channels have been molded directly during production of the extrusion.

14. A valve array comprising:
a connection device for valves, comprising:
a connection body extending along a main axis,
the connection body having consecutive valve mounting stands in a direction of the main axis, on which valves are configured to be mounted, and the connection body being provided with at least one row of consecutive receiving recesses in the direction of the main axis, wherein the receiving recesses are transverse to the main axis and leading to a common connection surface of the connection body,
the receiving recesses communicating with connection body channels passing into the connection body and into which connection units are configured to be inserted for connecting fluid lines, an inserted use position of which can be detachably fixed to the connection body by locking means having at least one U-shaped locking bracket,
wherein the locking means contain at least two locking channels at a distance from one another and aligned parallel to one another, wherein the at least two locking channels extend along the main axis in the connection body and in so doing each transversely penetrates at least two consecutive receiving recesses of the at least one row of receiving recesses, wherein the at least one U-shaped locking bracket is configured to be inserted and is longitudinally displaceable into the at least two locking channels, wherein the at least one locking bracket is configured to assume a lock position in which the at least one locking bracket reaches through the at least two consecutive receiving recesses simultaneously and is in locking engagement with the connection unit inserted therein by preventing withdrawal thereof,
wherein the at least one row of receiving recesses includes a first and a second row of receiving recesses that are aligned vertically on top of each other at the connection body, wherein two of the at least two locking channels, that are above and below the receiving recesses, are associated with each row of the first and second rows of receiving recesses, and
wherein electrically actuatable valves are mounted on the valve mounting stands.

* * * * *